Patented June 24, 1930

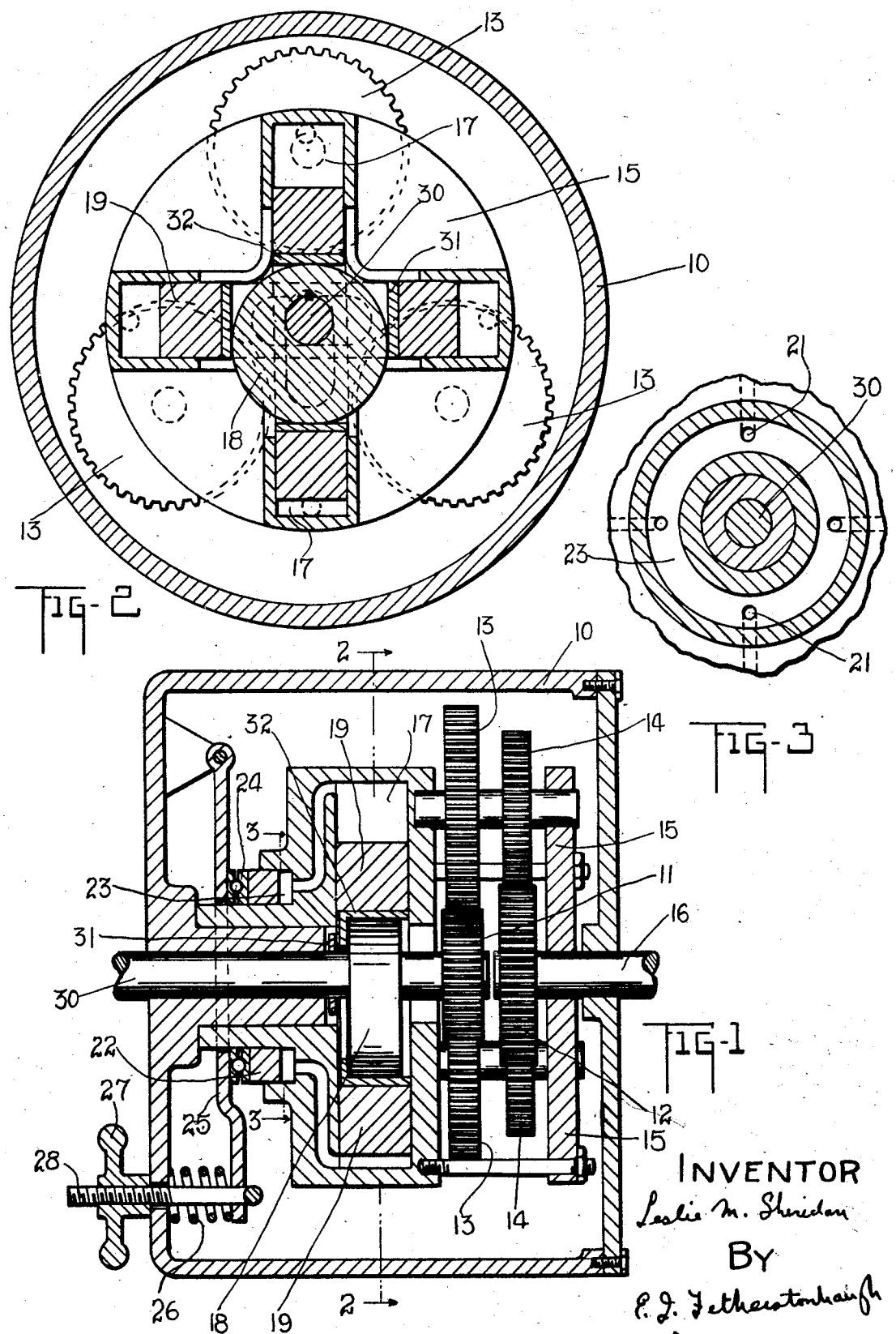

1,765,948

UNITED STATES PATENT OFFICE

LESLIE MITCHELL SHERIDAN, OF COPPERCLIFF, ONTARIO, CANADA

POWER-TRANSMITTING DEVICE

Application filed October 10, 1929. Serial No. 398,650.

This invention relates to a power transmitting device as described in the present specification and illustrated in the accompanying drawings which form part of same.

The invention consists essentially of the novel features pointed out broadly and specifically in the claims for novelty following a description containing an explanation in detail of an acceptable form of the invention.

The objects of the invention are to furnish a device that may be applied to motor vehicles, conveyors, rotary trucks, or any power transmission where a change in the speed ratio between the driving and driven members is desired; to devise means for controlling the rotation of shafts and that will be adaptable to many types of variable speed drive mechanism; to overcome the mechanical problem of applying motion to a still shaft by the elimination of a friction clutch. The substitution of a fluid force adapted to decrease in magnitude as the speed of the shaft increases until the ratio of speed to torque in the driven shaft is the same as that of the driving shaft, and generally to provide a desirable and efficient variable speed power transmission that will be cheap to manufacture and easily operable.

In the drawings, Figure 1 is a side sectional view of the device.

Figure 2 is a cross sectional view taken on lines 2—2 in Figure 1.

Figure 3 is a cross sectional view taken on lines 3—3 in Figure 1.

Like numerals of reference indicate corresponding parts in the various figures.

Referring to the drawings, the variable speed drive mechanism is formed of the frame and casing 10 supporting and journalling the set of planetary gears 13 and 14 in which the two sets of gears are supported in the cage 15 and rotatable around the sun gears 11 and 12 so that when the power is applied to rotate the gear 11 the speed of rotation of the gear 12 which is connected to the driven shaft 16 is proportionate to the direction and speed of rotation of the cage holding the gears 13 and 14. This particular arrangement of gears is more fully described in my co-pending United States application Serial No. 281,090, filed May 28, 1928.

In order to furnish efficient means for controlling the rotation of the cage, a fluid such as an oil or an oil compound is introduced into the cylinders or dash pots 17 and the eccentric 18 fixedly mounted on the driving shaft 30 engages the pistons 19 and reciprocates them in said cylinders or dash pots 17. The pistons are connected together and held against the eccentric by the straps 31 and 32.

The transfer of the operating fluid from cylinder to cylinder is controlled by the valve ring 22 introduced in the valve chamber 23. The ring 22 is held against the face of the ports 21 by a ball thrust bearing 24 engaged by the lever 25. The lever is held against the thrust ring by a spring 26 which can be adjusted by a handle 27 threaded on a screw 28. With this arrangement when the valve ring 22 closes the ports 21, the cage 15 will be forced to rotate at the same rate and in the same direction as the driving shaft 30.

When the ports are opened slightly so as to permit the slow flow of oil from one cylinder to an opposite cylinder, the cage 15 will slip backwards or at a slower rate of rotation than the driving shaft. If a perfectly free port is allowed, then the cage 15 will rotate backwardly at a higher rate of speed and the driven shaft 16 will come to a stop. Also, if the torque on the driven shaft is sufficient to produce enough pressure of oil against the annular ring 22 to compress the spring 26, then the speed of the shaft 16 will be automatically reduced to such a point as to cause an increase in torque to match that required on the shaft 16.

In the operation of the invention, the speed of the driving shaft is constant and the eccentrically mounted wheel or disc 18 rotates with said shaft and the fluid well 17 and reciprocates the plungers 19. These plungers in reciprocation transfer the fluid through the transfer passages from end to end of the fluid well 17, this communication being established in the valve chamber 23.

The consequence of this reciprocation of the plungers is that the planetary driving gears 13 travel on the sun gear 11 and as the gears 13 drive the planet gears 14, these gears 14 in co-action with the sun gear 12 travel around the sun gear at the same time communicating motion thereto, this motion being transmitted to the driven or transmission shaft 16.

The speed at which the planet gears 13 travel on the sun gear 11 is controlled entirely by the ring valve 22, the operation of which is in turn controlled by the adjusted spring 26. Therefore the freedom of the flow of the fluid is regulated by the position of the ring valve 22 in the valve chamber 23, and this position depends entirely on the load on the transmission shaft 16. In starting a motor vehicle or other mechanism, the transmission shaft 16 is in the state of inertia. Consequently the pressure on the ring valve is proportionately great with the result that the spring operated lever permits the valve to slide to an open position sufficient to cause a transfer of a fluid to the opposite ends of the well 17. Therefore the co-action of the planet gears with the sun gears is limited in so far as the rotation of their own shafts is concerned because of the slip occurring in their travel on the sun gears, but this travel gradually lessens as the speed of the transmission shaft increases until running speed has been reached. Then the ring valve which has been gradually closing completely blocks the transfer passages. Then the cam disc or wheel is locked causing the rotation of the gear frame and casing which then becomes a balance wheel carrying with it the planetary gear mechanism of both shafts which serve as reducing gears between the driving shaft and the driven shaft. It will thus be seen that it is in the reducing gears that the slip is provided so that the load may even up with the power in so far as the reduction gear mechanism will allow.

This is a very useful invention particularly for conveying or other apparatus having variable loads. Where applied to a vehicle, naturally some elaboration of the mechanism will be necessary.

It is obvious in the description of the details of the invention that the ring valve may be operated by hand, thus manually controlling the speed, or in varying the load under which the speed of rotation would be changed automatically by the device itself.

What I claim is:

1. In a power transmitting device, a main casing having shaft bearings, driving and driven shafts journalled in said bearings, a rotary casing forming dash pots and having transfer passages and a valve chamber, a ring valve operating in said valve chamber, a spring-held lever pivotally secured within said main casing and engaging said ring valve, plungers reciprocating in said dash pots, a disc eccentrically mounted on said driving shaft and engaging said plungers, a planetary reducing gear mechanism operatively connecting said driving and driven shafts and a gear frame supported by said rotary casing and said driven shaft.

2. In a power transmitting device, a main casing having shaft bearings, driving and driven shafts journalled in said bearings and in alignment with one another and suitably spaced at their adjoining ends, a rotary casing forming dash pots and having transfer passages and a valve chamber, a ring valve operating in said valve chamber, a spring-held lever pivotally secured within said main casing and engaging said ring valve, plungers reciprocating in said dash pots, a disc eccentrically mounted on said driving shaft and engaging said plungers, a planetary reducing gear mechanism operatively connecting said driving and driven shafts and a gear frame supported by said rotary casing and said driven shaft.

3. In a power transmitting device, a main casing having shaft bearings, driving and driven shafts journalled in said bearings, a rotary casing forming dash pots and having transfer passages and a valve, a ring valve operating in said valve chamber and held against the face of the transverse passage ports by a ball thrust bearing engaged by a springheld lever pivotally secured within said main casing, plungers reciprocating in said dash pots, a disc eccentrically mounted on said driving shaft and engaging said plungers, a planetary reducing gear mechanism operatively connecting said driving and driven shafts and a gear frame supported by said rotary casing and said driven shaft.

4. In a power transmitting device, a main casing having shaft bearings, driving and driven shafts journalled in said bearings and in alignment with one another and suitably spaced at their adjoining ends, a rotary casing forming dash pots and having transfer passages and a valve chamber, a ring valve operating in said valve chamber, a lever pivotally secured within said main casing and engaging said ring valve and held thereagainst by a spring adjustably controlled through a screw member, plungers reciprocating in said dash pots, a disc eccentrically mounted on said driving shaft and engaging said plungers, a planetary reducing gear mechanism operatively connecting said driving and driven shafts and a gear frame supported by said rotary casing and said driven shaft.

5. In a power transmitting device, a main casing having shaft bearings, driving and driven shafts journalled in said bearings, a rotary casing forming dash pots and having transfer passages and a valve chamber, a ring valve operating in said valve chamber, a springheld lever pivotally secured within said main casing and engaging said ring valve, plungers reciprocating in said dash pots, an eccentric disk fixedly mounted on said driving shaft engaging said plungers and reciprocating them in said dash pots, a planetary reducing gear mechanism operatively connecting said driving and driven shafts and a gear frame supported by said rotary casing and said driven shaft.

Signed at the town of Coppercliff, Ontario, Canada, this 31st day of August, 1929.

LESLIE MITCHELL SHERIDAN.